United States Patent [19]
Miyata et al.

[11] Patent Number: 5,039,509
[45] Date of Patent: Aug. 13, 1991

[54] PROCESS FOR THE PRODUCTION OF MAGNESIUM OXIDE

[75] Inventors: Shigeo Miyata; Hitoshi Anabuki, both of Takamatsu; Hitoshi Manabe, Miki, all of Japan

[73] Assignee: Kyowa Chemical Industry Co., Ltd., Kagawa, Japan

[21] Appl. No.: 473,156

[22] Filed: Jan. 31, 1990

[30] Foreign Application Priority Data

Feb. 10, 1989 [JP] Japan .................... 1-31592

[51] Int. Cl.$^5$ .............................. C01F 5/08
[52] U.S. Cl. .................... 423/636; 106/461; 423/274; 423/635; 423/638; 423/639; 501/108; 501/109; 501/122; 524/436
[58] Field of Search ............... 423/636, 638, 639, 635

[56] References Cited

U.S. PATENT DOCUMENTS

| | | | |
|---|---|---|---|
| 2,348,847 | 5/1944 | Pike | 423/639 |
| 4,145,404 | 3/1979 | Miyata et al. | 423/639 |
| 4,246,254 | 1/1981 | Miyata et al. | 423/639 |
| 4,505,887 | 3/1985 | Miyata et al. | 423/639 |

FOREIGN PATENT DOCUMENTS 0038891 11/1981 European Pat. Off. .
90355 6/1972 German Democratic Rep. .

OTHER PUBLICATIONS

Patent Abstracts of Japan, vol. 10, No. 23 (C-325)[2080], Jan. 29, 1986.
Patent Abstracts of Japan, vol. 12, No. 258 (C-513)[3105], Jul. 20, 1988.
Toda, Chemical Abstracts, vol. 108, No. 16, Apr. 1988, p. 145, Abstract No. 134349c.
Nakaya et al., Chemical Abstracts, vol. 104, No. 24, Jun. 1986, pp. 125-126, Abstract No. 209470p.

Primary Examiner—Wayne A. Langel
Attorney, Agent, or Firm—Wenderoth, Lind & Ponack

[57] ABSTRACT

A process for the production of a magnesium oxide having high hydrolysis resistance and high fluidity, which comprises:

(A) a step of reacting a water-soluble magnesium salt with an alkaline substance in such an amount that is not more than 0.95 equivalent weight based on 1 equivalent weight of the water-soluble magnesium salt, at a temperature of not more than 40° C., (B) a step of heating the resultant reaction product and its reaction mother liquor at about 50° to 120° C. to form a magnesium hydroxide, (C) a step of forming particles having an average secondary particle diameter of about 5 to 500 μm by using a spray drier, (D) a step of firing the particles at about 1,100° to 1,600° C., and (E) a step of pulverizing the resultant fired product under conditions which do not substantially destroy the average secondary particle diameter obtained in the above step (C).

4 Claims, 1 Drawing Sheet

PROCESS FOR THE PRODUCTION OF MAGNESIUM OXIDE

FIELD OF THE INVENTION

The present invention relates to a process for the production of a magnesium oxide having high hydrolysis resistance and high fluidity.

More specifically, the present invention relates to a process for the production of a magnesium oxide useful in a thermal conductivity improver of a resin, heat resistant material, electricity insulating material, sheathed heater filler, optical material, polishing material, etc., which has not only physical properties inherent to magnesium oxide such as high melting point (about 2,800° C.), high electric insulation quality, low dielectric loss characteristics, high light permeability, high thermal conductivity, basicity, etc., but is also imparted with high hydrolysis resistance and high fluidity.

PRIOR ART OF THE INVENTION

Magnesium oxides are classified into light burnt magnesium oxide (about 600° to 900° C.) and hard burnt magnesium oxide (about 1,100° to 1,500° C.). The former utilizes the excellent chemical activity which magnesium oxide exhibits in the neutralization of acids and halogens, and one typical example of such use is an acid acceptor for halogenated rubbers such as chloroprene, Hypalon, etc. The latter is used in articles which take advantage of the excellent physical properties of magnesium oxide, i.e. high melting point (about 2,800° C.), high electric insulation quality at high temperature, light permeability over a wide wavelength range, high thermal conductivity, etc., such as a heat resistant container, heat resistat part, heat insulating material, IC substrate, lens, sodium lamp container, sheathed heater, filler for resins, etc., polishing material, and the like.

However, magnesium oxide has a problem that it is gradually corroded with water or steam and converted to magnesium hydroxide (hydration) whereby its various physical properties explained above are lost, and the scope of its use is hence limited.

In order to solve the above problem, Japanese Laid-Open Patent Publication No. 85474/1986 proposes a firing process carried out at a temperature of not less than 1,600° C. and below a melting temperature (2,800° C.). Further, Japanese Laid-Open Patent Publication No. 36119/1986 proposes a process which comprises reacting a water solution containing a water-soluble magnesium salt with ammonia in such an amount that is 1 to 3.5 equivalent weight based on 1 equivalent weight of magnesium in the presence of a seed of magnesium hydroxide, thereby to form a magnesium hydroxide of an apparently spherical aggregate having an average secondary particle diameter of 5 to 500 $\mu$m, and firing the aggregate at 1,200° to 2,000° C.

Japanese Laid-Open Patent Publications Nos. 288114/1987 and 45117/1988 propose processes which comprise subjecting a fine powder of magnesium oxide to surface treatment with an organic silicate compound, and then subjecting the fine powder to heat treatment to form coatings of silica on the particle surfaces of the magnesium oxide.

However, in the firing process carried out at a temperature of not less than 1,600° C. and below the melting temperature of magnesium oxide, the crystal growth of magnesium oxide is poor for the firing temperature, and that, because of the firing, there are formed larger masses, which have to be pulverized with high strength. Therefore, useful single crystals of magnesium oxide which are formed at this stage are destroyed, and a variety of lattice defects are caused on the crystal surfaces. For this reason, there are problems that the magnesium oxide obtained as above does not exhibit any satisfactory hydrolysis resistance, and at the same time, that the particles thereof have nonuniform profiles and exhibit poor fluidity, whereby high-filling of them in resins is made difficult.

A magnesium oxide, which is formed by reacting an aqueous solution of a water-soluble magnesium salt with a prescribed amount of ammonia in the presence of a seed of magnesium hydroxide and then firing the reaction product at 1,200° to 2,000° C., has improved fluidity and can be easily filled into resins as compared with a powder-form product. In addition, the powder-form product here stands for a powder of coarse (not spherical) particles having an average particle diameter of about 10 to not more than 20 $\mu$m and nonuniform profiles, which are obtained by mechanical pulverization. Since, however, the magnesium hydroxide before the firing has a relatively large crystal form and has a fish scale-like profile, the formability by firing is not satisfactory, although it is improved more than that of a powder of magnesium hydroxide. Further, this magnesium hydroxide has to be fired at higher temperature. And, not only particles bond to each other in an aggreate, but also aggreates bond to each other, and there is an necessity of pulverization with high strength. As a result, nearly spherical secondary aggregates are concurrently destroyed, and the defect portion on the crystal surface increases in size. There is therefore formed a magnesium oxide having insufficient resistance to hydrolysis.

According to the process which comprises subjecting a fine powder of magnesium oxide to surface treatment with an organic silicate compound, and then subjecting the fine powder to heat treatment to form coatings of silica on the particle surfaces of the magnesium oxide, there is provided a surface-coated magnesium oxide of which the hydrolysis resistance per unit area is improved as compared with magnesium oxide per se, since the surface of the magnesium oxide is coated with silica. Since, however, the surface area is large, the hydrolysis resistance is insufficient, and a larger amount of an organic silane is required due to large surface areas of about 5 to 20 m$^2$/g. Therefore, this surface-coated magnesium oxide is not economical, and there is also a problem that the excellent thermal conductivity of magnesium oxide is deteriorated.

SUMMARY OF THE INVENTION

The object of the present invention is to solve the above problems and provide a process for the production, at a firing temperature lower than those used in conventional processes, of a magnesium oxide which not only has high fluidity to permit excellent workability, but also has a secondary particle diameter and bulk density to enable high-filling of itself into a resin required for sufficient improvement of thermal conductivity, and which further has high resistance to hydrolysis.

Another object of the present invention is to provide a process for the production of a magnesium oxide which comprises treating the above magnesium oxide having high hydrolysis resistance with an organic silane, whereby the magnesium oxide is imparted with excellent hydrolysis resistance.

According to the present invention, there is provided a process for the production of a magnesium oxide, which comprises
(A) a step of reacting a water-soluble magnesium salt with an alkaline substance in such an amount that is not more than 0.95 equivalent weight based on 1 equivalent weight of the water-soluble magnesium salt, at a temperature of not more than 40° C.,
(B) a step of heating the resultant reaction product and its reaction mother liquor at about 50° to 120° C. to form a magnesium hydroxide,
(C) a step of forming particles having an average secondary particle diameter of about 5 to 500 μm by using a spray drier.,
(D) a step of firing the particles at 1,100° to 1,600° C., and
(E) a step of pulverizing the resultant fired product under conditions which do not substantially destroy the average secondary particle diameter obtained in the above step (C).

Further, according to the present invention, there is also provided a process for the production of a magnesium oxide, which comprises bringing the magnesium oxide obtained in the above process into contact with a mixture liquid of alkoxysilane, alcohol, water and acid, and then firing the treated magnesium oxide at 500° to 900° C. to form a Silicon oxide on the surface thereof. The magnesium oxide obtained according to this process also has high fluidity and high filling ability.

DETAILED DESCRIPTION OF THE INVENTION

Figure 1:
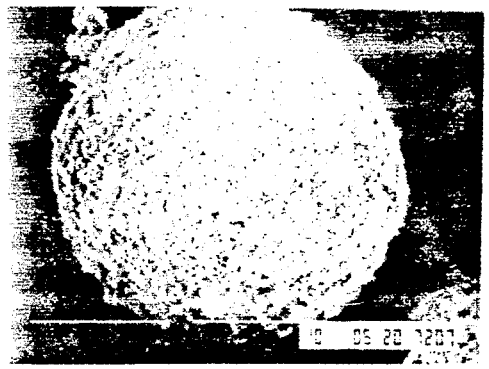
FIG. 1 is a scanning electron microscope photograph (crystal structure: magnification, 1,750 diameters) of particles of a magnesium hydroxide produced in Example 1.

The present invention has been completed by the following finding, that is, a magnesium oxide having high fluidity, high filling ability and high hydrolysis resistance can be obtained by forming, at first, a high-dispersibility crystallite magnesium hydroxide synthesized in special methods of the above steps (A) and (B) into particles by using a spray drier at the above step (C), and then subjecting the particles to the low temperature firing at the above step (D) and the pulverization under conditions which do not substantially destroy the fired particles at the above step (E).

The synthesis of the high-dispersibility crystallite magnesium hydroxide in the above steps (A) and (B) is carried out by mixing and reacting a water-soluble magnesium salt with an alkaline substance in an amount of not more than 0.95 equivalent weight, preferably 0.5 to 0.90 equivalent weight, based on 1 equivalent weight of the water-soluble magnesium salt, at a temperature of not more than 40° C., preferably not more than 30° C., and then heating the reaction product together with its reaction mother liquor at about 50° to 120° C. under atmospheric or elevated pressure for about 0.5 to several hours.

According to the above synthesis, there is obtained a magnesium hydroxide which is a high-dispersibility crystallite having an average secondary particle diameter of not more than 2 μm, a BET specific surface area of 15 to 60 m$^2$/g, a plate-like crystal diameter of about 0.01 to 0.5 μm and a thickness of 0.01 to 0.1 μm. By selecting the magnesium hydroxide synthesis conditions suitably, a particularly preferable magnesium hydroxide can be obtained, which has an average secondary particle diameter of not more than 1.0 μm, a BET specific surface area of 20 to 40 m$^2$/g, a plate-like crystal diameter of 0.05 to 0.3 μm and a plate-like crystal thickness of 0.02 to 0.06 μm.

Examples of the water-soluble magnesium salt used in the above step (A) are magnesium chloride, magnesium nitrate, magnesium acetate, etc. Examples of the alkaline substance are sodium hydroxide, calcium hydroxide, potassium hydroxide, ammonia, etc.

When the equivalent ratio of the alkaline substance and the temperature in the above reaction exceed 0.95 equivalent weight and 40° C., respectively, the intended high-dispersibility crystallite magnesium hydroxide is not obtained, but there is obtained a magnesium hydroxide having high aggregation powder, i.e. a larger secondary particle diameter. Thus, one advantage of the present invention, formability of a magnesium oxide by low-temperature firing, is lost. Further, when the heating temperature at the step (B) exceeds 120° C., magnesium hydroxide crystals grow to excess, and the formability by low-temperature firing and high fluidity are deteriorated.

The formation of particles by using a drier in the step (C) is carried out by, first, washing the magnesium hydroxide obtained in the above step (B) with water to remove impurities, and then forming the magnesium hydroxide into particles in the presence or absence of a binder and drying them, where it is freely possible to form generally spherical particles having an average secondary particle diameter in the range of from about 5 to 500 μm. Incorporation of the binder is preferable in view of the fact that it increases the strength of the formed particles and prevents the sintering among the particles at the firing time. The particles obtained as above are composed of a magnesium hydroxide having high fluidity and high sinterability.

Examples of the binder are preferably organic binders such as polyvinyl alcohol, carboxymethyl cellulose, polyethylene wax, polyacrylic acid, polyvinyl acetate, styrene-acryl copolymer, gum arabic, polystyrene, sodium alginate, etc.

The firing of the magnesium hydroxide at the step (D) is carried out at a temperature of about 1,100° to 1,600°, preferably about 1,200° to 1,400° C. for about 0.5 to several hours under natural atmosphere or atmosphere of oxygen, nitrogen, etc., by using a firing apparatus such as a rotary kiln, tunnel furnace, muffle furnace, etc. If the firing temperature is lower than the above lower limit, the resultant magnesium oxide has insufficient hydrolysis resistance, and when it is higher than 1,400° C., the resultant product is too hard and required to be pulverized with high strength, with the result that the spherical partricle forms thereof are damaged to deteriorate its fluidity. Further, the hydrolysis resistance of the product is hardly improved as compared with that of a product formed by firing at lower temperatures than said upper limit.

The pulverization of the fired product at the step (E) is carried out by using a ball mill, crusher, etc., for about dozens of minutes to several hours until the product is pulverized to a size of the particles formed at the step (C). The pulverization is performed for such a period of time that the particles obtained at the step (C) are not substantially destroyed. When the firing temperature is suitably selected, it is possible to obtain as soft a fired product as can be also pulverized to the size of the particles only by using, e.g. a screen classifier without using any of the above pulverizing means. Only when the steps (A) to (D) of the present invention are carried out, i.e., only when the magnesium oxide is formed by subjecting the high-dispersibility crystallite magnesium hydroxide produced at the step (B) to the particle formation and drying using a spray drier at the step (C) and then firing the formed particles at a low temperature at the step (D), it is possible to maintain the spherical forms in the pulverization of the step (E).

The magnesium oxide formed in the step (D) of the present invention is in a state that the sintering has proceeded only within each of the spray-formed particles, and the magnesium oxide can be easily pulverized and exhibits hydrolysis resistance at high level. Further, the magnesium oxide pulverized in the step (E) has a nearly spherical form, a secondary particle diameter of about 5 to 500 μm, preferably about 10 to 50 μm and a bulk density of not less than about 1 g/ml. Due to these properties, this magnesium oxide can be incorporated into a resin in such an amount that is necessary to impart the resin with sufficient thermal conductivity, and has excellent workability for forming ceramics. Individual single crystals within the fired and pulverized product have a particle diameter of about 0.5 to 10 μm and a BET specific surface area of not more than 1 $m^2/g$.

The magnesium oxide obtained as above can be further imparted with hydrolysis resistance at higher level by treating it as follows. The magnesium oxide is brought into contact, by mixing, with a mixture liquid of an alcohol such as methyl alchol, ethyl alcohol, etc., an alkoxy siliane such as methoxy silane, ethoxy silane, etc., a small amount of water, and an acid such as hydrochloric acid, nitric acid, phosphoric acid, surfuric acid, etc., at a temperature up to about 100° C., and the magnesium oxide is then separated by means of filtration, etc., and fired at a temperature of about 300° to 900° C., preferably about 500° to 800° C. for about 0.1 hour to several hours.

The magnesium oxide obtained as above has further improved hydrolysis resistance, since the surface of magnesium oxide crystals exposed on the surface of the fired and pulverized product obtained at the step (E) is coated with silica or a reaction product between silica and magnesium oxide.

The amount of the alkoxysilane, as $SiO_2$, for the above coating is about 0.1 to 3% by weight, preferably about 0.2 to 2.0% by weight, based on the magnesium oxide.

In the present invention, those individual single crystals within the fired and pulverized product that have surface coatings of the alkoxysilane have a BET specific surface area of not more than 1 $m^2/g$. Therefore, not only high hydrolysis resistance can be achieved by using a smaller amount of silica than that in a conventional technique for coating a magnesium oxide powder with silica, but also the required amount of silica can be decreased. As a result, the excellent physical properties inherent to magnesium oxide, such as thermal conductivity, etc., are not deteriorated.

The copresence of a small amount of water and an acid is useful to promote the reactivity of the alkoxysilane to the magnesium oxide surface.

According to the present invention:

There is provided a process for the production of a magnesium oxide having high hydrolysis resistance.

There is also provided a process for the production of a magnesium oxide having high fluidity.

There is further provided a process for the production of a magnesium oxide which can be filled in a resin in such an amount that can impart the resin with sufficient thermal conductivity.

There is furthermore provided a process for the production of a magnesium oxide having a nearly spherical form, a secondary particle diameter of about 5 to 500 μm, and a bulk density of about 1 $g/cm^3$.

The present invention will be explained further in detail by reference to Examples.

In Examples, angles of repose were measured by using an angle of repose measuring device (model FK) manufactured by Konishi Seisakusho.

EXAMPLE 1

Ion bittern (20 l) containing 1.5 moles/l of magnesium chloride and 0.5 mole/l of calcium chloride was charged to a 50-liter stainless steel cylindrical reactor with a stirrer, and the temperature thereof was adjusted to about 25° C. by using a jacket. 12 l of sodium hydroxide (4.0 moles/l, corresponding to 0.8 equivalent weight based on magnesium chloride) was all added over about 5 minutes while the mixture was stirred, and the reaction mixture was further stirred for 5 minutes. Then, the temperature thereof was elevated up to 90° C. with stirring, and maintained at this temperature for about 2 hours. Thereafter, the reaction mixture was dehydrated by filtration under reduced pressure and washed with water to give a magnesium hydroxide.

The magnesium hydroxide had a BET specific surface area of 22 $m^2/g$ and an average secondary particle diameter, measured by microtrack method, of 0.53 μm, and contained 99.6% by weight of $Mg(OH)_2$ and 0.02% by weight of CaO.

The above magnesium hydroxide was dispersed in water to form a slurry containing about 20% by weight thereof. 1% by weight, based on the magnesium hydroxide, of a polyethylene wax in an emulsion state was added to and uniformly mixed with the slurry. Then, the mixture was formed into particles by using an NIRO spray drier in which the hot air inlet temperature was about 350° to 370° C. and the air outlet temperature was about 100° to 110° C. according to an atomizer method.

Figure 2:
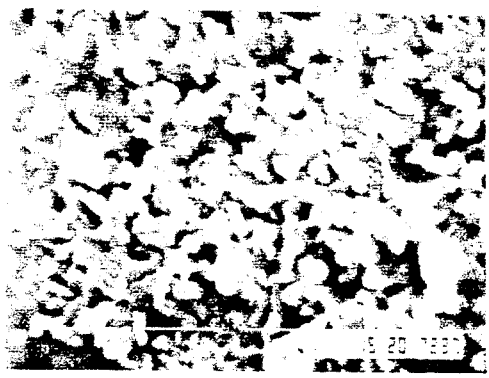
FIG. 2 is a scanning electron microscope photograph (crystal structure: magnification, 10,000 diameters) of the same.

The scanning electron microscopic observation of the formed particle showed that the magnesium hydroxide had nearly truly spherical profiles having a diameter of 20 to 40 μm, a cryatal length of 0.1 to 0.2 μm, a thickness of 0.02 to 0.04 μm (magnification, 1,750 diameters in FIG. 1, 10,000 diameters in FIG. 2).

This spray-dried magnesium hydroxide was separated into three portions, and these portions were fired in a kanthal furnace at 1,150° C., 1,250° C. and 1,400° C. for 2 hours, respectively. The fired products obtained by firing at 1,150° C. and 1,250° C. were so soft as to be hand-crushable.

Figure 3:
FIG. 3 is a scanning electron microscope photograph (crystal structure: magnification, 1,000 diameters) of particles of a magnesium oxide produced in Example 1.

The fired products each were pulverized in a ball mill for 0.5 to 1 hour, and the average secondary particle diameter of each was measured by a microtrack method to show about 22 μm. The scanning electron microscopic observation showed that the fired products each were a sintered body in which nearly truly spherical crystals of magnesium oxide were densely filled (FIG. 3, magnification, 1,000 diameters).

Table 1 shows the physical properties of the products fired at 1,150° C., 1,250° C. and 1,400° C.

Table 2 shows physical properties of the sintered body.

TABLE 2

| Firing temperature °C. | Crystal particle diameter μm | BET specific surface area m²/g | Apparent specific gavity g/ml | Hydrolysis resistance wt. % | Angle of repose | MgO content wt. % |
| --- | --- | --- | --- | --- | --- | --- |
| 1,250 | 3-5 | 0.1 | 1.3 | 4.5 | 34° | 99.6 |

TABLE 1

| Firing temperature °C. | Crystal particle diameter μm | BET specific surface area m²/g | Apparent specific gravity g/ml | Hydrolysis resistance wt. % | Angle of repose | MgO content wt. % |
| --- | --- | --- | --- | --- | --- | --- |
| 1,150 | 2-3 | 0.5 | 1.1 | 6.4 | 44° | 99.4 |
| 1,250 | 3-6 | 0.2 | 1.2 | 5.1 | 44° | 99.5 |
| 1,400 | 6-10 | 0.1 | 1.5 | 3.6 | 44° | 99.8 |

Notes:
(1) Crystal particle diameter: Measurement was made by electron microscopic observation.
(2) Apparent gravity: Measurement was made according to JIS-K6224.
(3) Hydrolysis resistance: A weight increase (%) was measured after immersing a sample in a boiling water at 100° C. for 5 hours.
(4) Angle of repose: A smaller angle shows better fluidity. A powder of magnesium oxide has a angle of repose of about 59°.

EXAMPLE 2

Part of the magnesium hydroxide obtained in Example 1 was mixed with a styrene/acryl copolymer as a binder in an amount of 2% by weight on the basis of the magnesium hydroxide, and the mixture was formed into particles and dried by using a nozzle type spray drier (manufactured by NIRO) having a nozzle diameter of 2.4 mm under the adjustment of the hot air inlet temperature 400° to 420° C. and the air outlet temperature to 150° to 170° C. The optical microscopic observation of the resultant magnesium hydroxide showed that it was spherical particles having a diameter of about 100 to 300 μm.

These magnesium hydroxide particles were fired at 1,250° C. for 3 hours. The fired particles were so soft as to be hand-crushable. These particles were treated in a ball mill for 30 minutes to give a magnesium sintered body having a nearly truly spherical form with an average secondary diameter of about 200 μm.

EXAMPLE 3

Part (100 g) of each of the magnesium oxides (a product fired at 1,150° C., 1,250° C. or 1,400° C. in Example 1) was added to a mixture liquid of 3.5 g of tetraethoxysilane, 250 ml of ethyl alcohol, 20 ml of water and 20 ml of hydrochloric acid, and the mixture was fully stirred at about 70° C. for 5 minutes, and filtered. The remaining solid was heated at 800° C. for 2 hours to give a silane-treated magnesium oxide.

Table 3 shows physical properties of the silane-treated magnesium oxides.

TABLE 3

| Products fired at °C. | Hydrolysis resistance wt. % | SiO₂ content wt. % | MgO content wt. % |
| --- | --- | --- | --- |
| 1,150 | 0.87 | 0.74 | 99.0 |
| 1,250 | 0.79 | 0.72 | 99.1 |
| 1,400 | 0.36 | 0.71 | 99.2 |

COMPARATIVE EXAMPLE 1

A magnesium hydroxide powder having a BET specific surface area of 40 $m^2/g$ and a secondary average particle diameter of 4.8 μm was fired in a kanthal furnace at 1,400° C. for 2 hours, and then pulverized in a ball mill for about 6 hours. The resultant fired product showed a hydrolysis resistance value of 28 wt. % and a angle of repose of 59°.

This magnesium oxide was treated with silica in the same way as in Example 2, and the silica-treated product had a hydrolysis resistance value of 15.2 wt. %.

What is claimed is:

1. A process for the production of a magnesium oxide, which comprises
   (A) reacting a water-soluble magnesium salt with an alkaline substance in an amount of 0.5 to 0.95 equivalent weight based on 1 equivalent weight of the water-soluble magnesium salt, at a temperature of not more than 40° C.,
   (B) heating the resultant reaction product and its reaction mother liquor from (A) at about 50° to 120° C. to form a magnesium hydroxide,
   (C) forming particles having an average secondary particle diameter of about 5 to 500 μm from the product of the heating step (B) by using a spray drier,
   (D) firing the resultant particles from (C) at about 1,100° to 1,600° C. to form magnesium oxide, and
   (E) pulverizing the resultant fired magnesium oxide product from (D) under conditions which do not substantially destroy the average secondary particle diameter obtained in the above step (C).

2. A process according to claim 1, wherein the magnesium hydroxide formed in step (B) has a BET specific surface area of 15 to 60 $m^2/g$, an average secondary particle diameter of not more than 2 μm and a calcium content, as CaO, of not more than 0.1% by weight based on the magnesium hydroxide.

3. A process according to claim 1, wherein step (C) is carried out by incorporating about 0.1 to 10% by weight of a binder into the magnesium hydroxide.

4. A process according to claim 1, wherein the magnesium oxide obtained in step (E) has a single crystal particle diameter of 0.5 to 10 μm, a secondary particle diameter of 5 to 500 μm, a single crystal BET specific surface area of not more than 1 $m^2/g$ and an apparent specific gravity of not less than 1 $g/cm^3$.

* * * * *